United States Patent [19]

Katsuyama

[11] 4,370,041

[45] Jan. 25, 1983

[54] COMBINATION PHOTOGRAPHING AND DEVELOPING APPARATUS

[75] Inventor: Tsutomu Katsuyama, Yokohama, Japan

[73] Assignee: Mochizuki Shoten, Limited, Yokohama, Japan

[21] Appl. No.: 312,714

[22] Filed: Oct. 19, 1981

[51] Int. Cl.³ .............................................. G03B 17/50
[52] U.S. Cl. ....................................... 354/92; 354/93; 354/211; 352/72
[58] Field of Search .................... 354/89, 90, 91, 92, 354/93, 211, 320, 321, 322; 355/27, 28; 352/72, 78 R, 76, 130

[56] References Cited

U.S. PATENT DOCUMENTS

| | | | |
|---|---|---|---|
| 3,181,444 | 5/1965 | Takats et al. | 354/78 |
| 4,195,923 | 4/1980 | Craven et al. | 354/91 |
| 4,266,866 | 5/1981 | Dodge et al. | 354/90 |

FOREIGN PATENT DOCUMENTS 2036988 7/1980 United Kingdom ................. 354/93

Primary Examiner—L. T. Hix
Assistant Examiner—Alan Mathews
Attorney, Agent, or Firm—Kurt Kelman

[57] ABSTRACT

Combination photographing and developing apparatus incorporates in the photographing section thereof a storage reel capable of being selectively rotated in the forward or rearward direction in addition to a payoff reel having a roll of film thereon. During photography, the storage reel is rotated in the forward direction synchronously with the photographing operation to take up the exposed portion of the film thereon. When the photographing operation is completed, the film is cut at the tail end of the exposed portion thereof and the storage reel is rotated in the rearward direction, so that the exposed portion of the film is forwarded, with the cut tail end thereof in the lead, to the developing section, there to be developed and dried.

9 Claims, 14 Drawing Figures

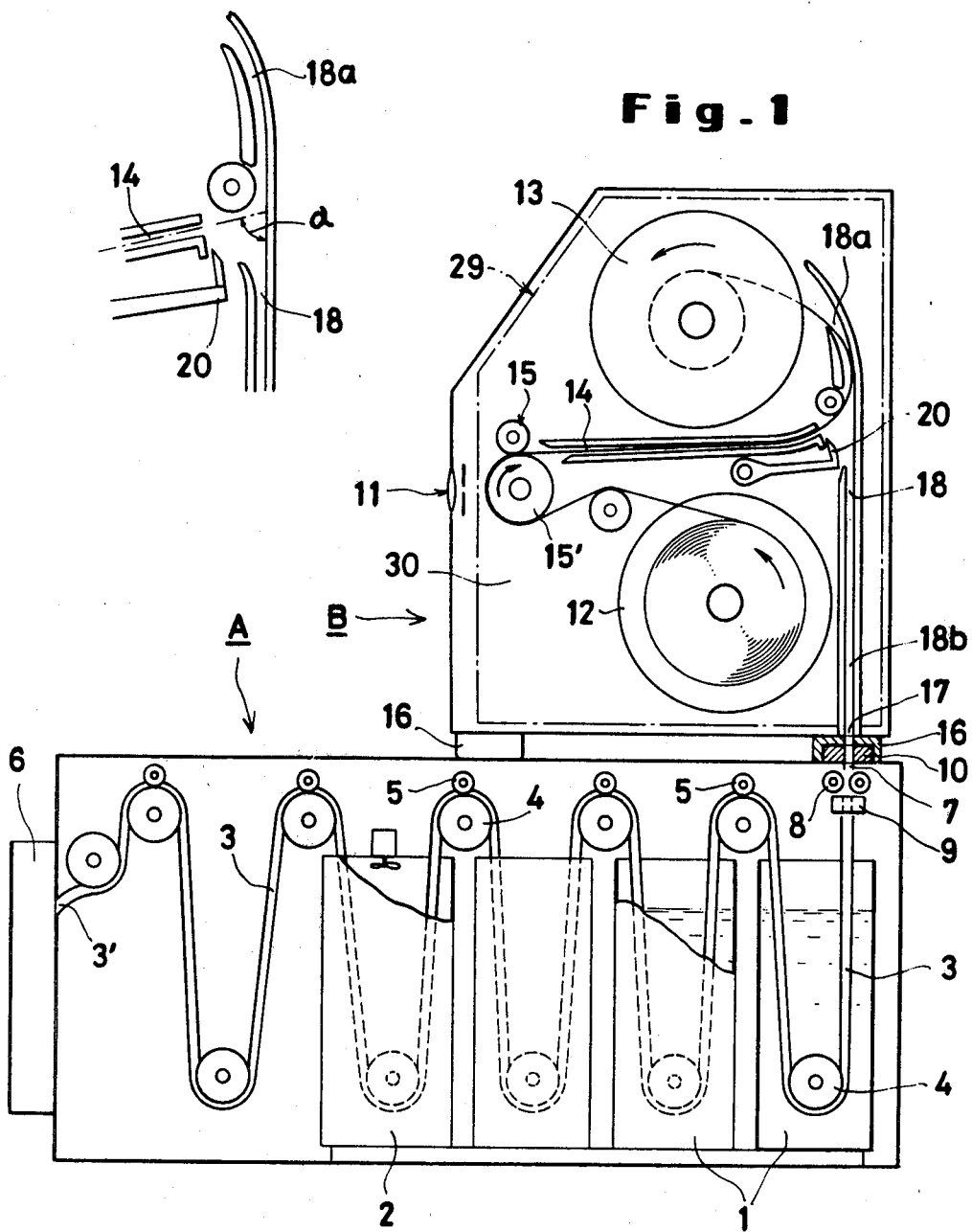

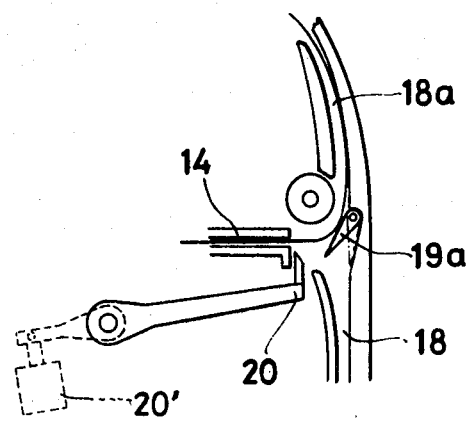
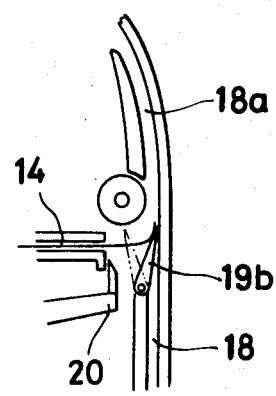
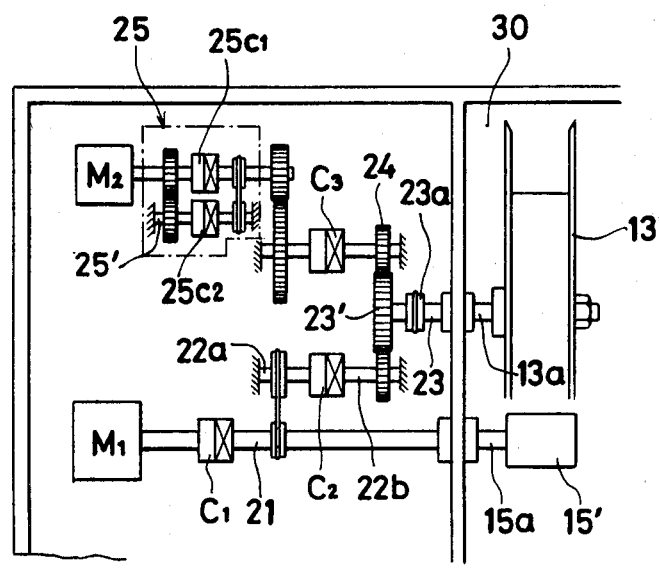

COMBINATION PHOTOGRAPHING AND DEVELOPING APPARATUS

BACKGROUND OF THE INVENTION

This invention relates to a combination photographing and developing apparatus having a photographing section and a developing section integrally connected to each other thereby allowing given data to be photographed on a roll of film by the photographing section and subsequently the exposed film to be developed by the developing section and producing a completed film.

Banks and other establishments which handle notes such as bills and checks make a point of daily photographing on microfilm, for the purpose of record, all the notes received from customers and transferred to clearing houses. The conventional device used for photographing such notes on microfilm has comprised separate photographing and developing units. The user, therefore, has been compelled to have all the notes received in a given day photographed by the photographic unit, rewind the exposed portion of the microfilm, cut the portion of the microfilm from the remainder of the microfilm at the end of the day's photographing, remove the rewound roll of exposed microfilm, and subject it to development in the developing unit. Since both the photographic unit and the developing unit of the conventional device are installed in normally illuminated rooms, the microfilm being cut and removed from the photographic unit is liable to accidental exposure. The user, therefore, is required to prevent the exposed portion of the microfilm from being accidentally exposed upon removal from the photographic unit by following the practice of separating the exposed portion of the microfilm from the remaining, unexposed portion of the microfilm by inserting a cut at the end of a two- to three-meter extra portion following the end of the exposed portion, rewinding the exposed portion so that the extra portion forms the tail end of the rewound roll of the microfilm, and then removing the rewound roll of microfilm from the photographic unit, and consequently protecting the photographed portion from accidental exposure by allowing the extra portion now forming the outermost layer of the rewound roll of microfilm to be sacrificed. At the time that the exposed portion of the microfilm plus the extra portion which has been cut and rewound in the photographic unit is removed by opening the photographic unit, the first few layers in the roll of microfilm remaining in the photographic unit are exposed. To start the next day's photographing, the user is required to pay off these first exposed layers of the roll of microfilm and bring the first part of the unexposed roll of microfilm to the position for starting the photographing. The length of the microfilm thus wasted also measures roughly two to three meters. The portion of the microfilm developed every day by the developing unit, therefore, contains wastefully exposed portions, each 2 to 3 meters in length, one before and one after the photographed portion.

Besides, the work of cutting the microfilm at the end of the day's photographing, removing the separated exposed portion of the microfilm from the photographing unit, and mounting the rewound roll of the exposed microfilm on the developing unit takes much time and trouble. Because the developing unit which makes use of various liquid agents such as developing agent and fixing agent is opened every day for insertion of the exposed roll of microfilm, there is a possibility of the user's hands and clothes being soiled with such liquid agents.

To overcome this fault found with the conventional device, the inventors proposed a combination photographing and developing apparatus wherein a photographing section provided with a loading part for loading a roll of film and a camera for photographing given data on the film paid off from the loading part and a developing section provided with a developing liquid tank, a washing water tank, a drying part, and a detachable takeup reel are integrally connected to each other so that the film may be advanced through a prescribed route, passed through the photographing position of the camera, led into the developing section, there to be sent through the developing liquid tank, the washing water tank, and the drying part, and finished as a complete film (Patent Application Disclosure No. Sho 55(1980)-64229). This apparatus is designed so that the photographing time and the developing time are equalized to each other and the exposed portions of the roll of film are successively forwarded to the developing section to be developed. Each time a photographing operation is completed, the film up to the tail end of the exposed portion of the roll of film is advanced from the photographing section to the developing section, with the result that a fair length of the unexposed portion of the roll of film is paid off wastefully. Further since the film feed rate is unnaturally equalized between the photographic section and the developing section, there is entailed the disadvantage that the retention time of the film in the developing liquid is elongated when the time spent in photographing is lengthened, for example. To eliminate this disadvantage, the inventor proposed an improved version wherein a shielded chamber for pooling the exposed portion of the film is disposed between the photographing section and the developing section and after the exposed film thus pooled within the shielded chamber has accumulated to a prescribed length, the film is paid off into the developing section to be developed at the optimum speed. The incorporation of the shielded chamber adapted to pool a large volume of exposed film brings about an inevitable addition to the overall size of the apparatus as a whole. When a given photographing operation is excessively long, the photographing must be interrupted for the purpose of permitting the exposed film pooled to capacity in the shielded chamber to be forwarded to the developing section to be developed therein. Besides, since the shielded chamber is adapted so that the exposed film pooled therein is pulled downwardly out of the chamber and forwarded to the developing section, it tends to damage the film. The improved version, accordingly, is not free from faults.

SUMMARY OF THE INVENTION

An object of this invention is to provide a combination photographing and developing apparatus which permits both photographing and developing to be carried out under the respectively optimum conditions in spite of large variations among the individual photographing operations and which involves very small amounts of wasteful film discharge.

To accomplish the object described above according to the present invention, there is provided a combination photographing and developing apparatus wherein the photographing section is provided with a storage reel capable of being rotated in the forward and rearward direction in addition to a payoff reel loaded with a roll of film to be used for photography, so that while the photographing is in progress, the storage reel is rotated in the forward direction to rewind the exposed portion of the film thereon and, after one photographing operation has been completed and the exposed portion of the film has been separated from the remainder of the film by inserting a cut with a cutter at the end of the exposed portion, the storage reel is rotated in the rearward direction to pay off the exposed portion of the film, with the tail end of the exposed portion in the lead, to the developing section to be developed therein eventually to give rise to a dry, developed film.

Even when one photographing operation is long such that the whole roll of film (of an overall length of 100 feet) is used up and substantially the entire length of this roll of film is exposed or when one series of photographing operation is extremely short and involves only 20 to 30 cm of film length, the exposed portion of the film can be efficiently developed without entailing any appreciable amount of wasteful film discharge.

The combination photographing and developing apparatus of this invention can be produced in a type such that a payoff reel having a roll film wound thereon may be loaded within the housing of a photographing section. Alternatively, it can be embodied in a type such that various mechanical elements other than the camera, such as a payoff reel, a storage reel, and a cutter may be encased in a cassette and the cassette loaded within the housing of a photographing section.

The adoption of the cassette offers an advantage of its own. When the data to be photographed is so large that it cannot be photographed on a roll of film of an overall length of 100 feet, the cassette containing the wholly exposed film can be removed and a newly supplied cassette loaded in its place, with this procedure repeated until all the data have been photographed. When the data to be photographed are divisible by kind into bills and checks, for example, there may be prepared as many cassettes as different kinds of data and each cassette used for photographing data of one kind. Otherwise, the photographing section and the developing section can be encased in separate cassettes so that the two sections may be joined into one operable combination or incorporated into one machine body to avoid otherwise possible increase in the overall size of the apparatus.

The other objects and characteristics of the present invention will become apparent from the further disclosure of the invention to be made hereinbelow with reference to the accompanying drawing.

BRIEF DESCRIPTION OF THE DRAWING

FIG. 1 is a longitudinally sectioned side view of a first embodiment of the combination photographing and developing apparatus according to the present invention.

FIG. 2 is an enlarged side view illustrating the arrangement of the guide path of the film in the embodiment of FIG. 1.

FIG. 3(A) is an enlarged side view illustrating a modification of the film guide path of FIG. 2.

FIG. 3(B) is an enlarged side view illustrating yet another modification of the film guide path.

FIG. 4 is a front view illustrating a driving mechanism for a capstan and a storage reel in the apparatus of FIG. 1.

DESCRIPTION OF PREFERRED EMBODIMENTS

Figure 5:
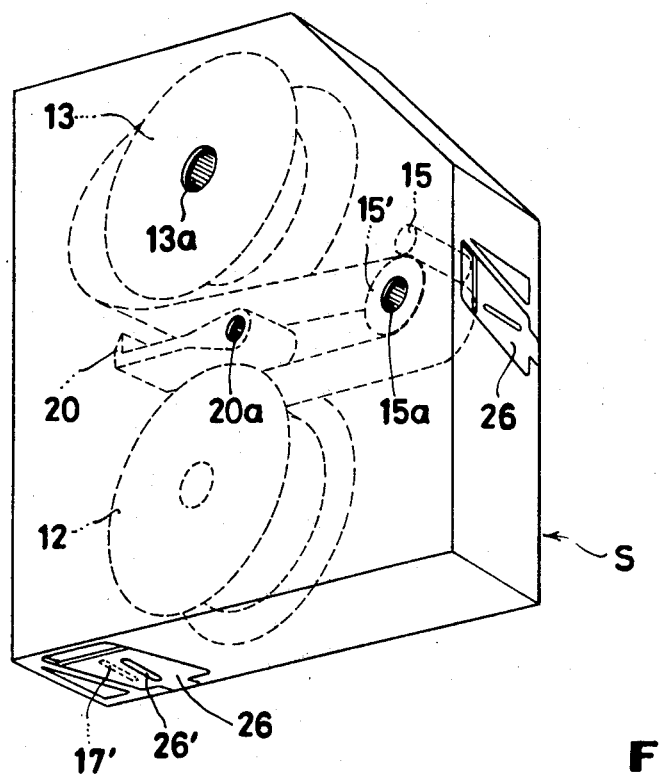
FIG. 5 is a perspective view illustrating one embodiment of a cassette containing therein a film to be exposed.
Figure 6:
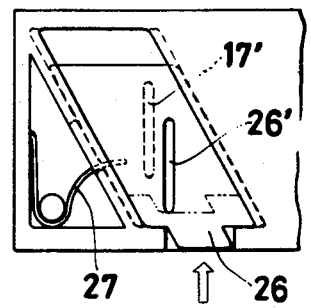
FIG. 6 is an enlarged front view illustrating a shutter part of the cassette.

In the first embodiment illustrated in FIGS. 1-4, the photographing section "B" is mounted on the developing section "A" and these two sections are joined into one operable combination so that the portion of the film exposed to the data in the photographing section may be developed in the developing section.

The developing section "A" comprises a group of liquid tanks 1 including two tanks containing a developing liquid and a fixing liquid respectively or one tank containing a mixed liquid combining the ability to develop and the ability to fix and a water washing tank, a drying chamber 2 for drying washed film as by blowing hot air thereagainst, and a developing route 3 for sequentially advancing the film in a vertically zigzagging pattern through the aforementioned group of liquid tanks 1 and the drying chamber 2. At the positions where the zigzagging developing route forms sharp turns, there are provided free rollers 4. Of the free rollers 4, those situated in an upper row have drive rollers 5 held in tangential contact therewith. By the rotation of the drive rollers 5, the film is advanced at a prescribed speed through the developing route toward the outlet 3'. During the passage through this developing route, the exposed film sequentially undergoes the treatments of developing, fixing and drying.

In the present embodiment, the outlet 3' of the developing route opens in the form of a slit to the outside of the shell of the developing section. The completed film is discharged through the outlet, received into a receptacle 6 detachably attached to the lateral side of the developing section, and stored in a zigzagging pattern within the receptacle 6. Optionally, the outlet 3' may be opposed to a self-winding auto-reel being rotated inside or outside the developing section, so that the film may be rewound on this auto-reel.

At the inlet 7 of the developing route, there are a pair of pinch rollers 8 and an immediately subsequent detection device 9 formed as of photoelectric elements capable of detecting the leading end of the film. The detection device 9, upon detecting the entry of the film into the developing section, causes one of the pair of pinch rollers 8 which have so far been kept apart from each other to move toward the other pinch roller and press it against the latter pinch roller and, at the same time, sets the pinch rollers 8 and the group of driving rollers 5 moving in the direction of advancing the film. When the tail end of the film has passed the detection device 9, the device 9 causes a timer (not shown) to stop the pinch rollers 8 and the group of drive rollers 5 after the lapse of the time required for the tail end of the film to reach and depart from the outlet 3'.

On the upper side of the developing section, there is provided a small projection portion 10. The inlet 7 of the developing route opens in the upper surface of this small projecting portion 10.

The photographing section "B" comprises a camera 11 for exposing the film to the data and photographing the data on the film, a payoff reel 12 having a roll of film wound thereon, a reversibly rotatable storage reel 13 for taking up the exposed portion of the film thereon by its forward motion, a horizontal guide route 14 for leading the film from the payoff reel through the exposure position of the camera to the storage reel, and forward delivery means serving to advance the film in the forward direction along the guide route synchronously with the photographing operation, e.g. a pair of rollers 15, 15' as in the illustrated embodiment. In the illustrated embodiment, the storage reel 13 is disposed above the payoff reel 12 and the guide route 14 is consequently adapted to guide the film from the payoff reel 12 around the feed roller 15' and across the space intervening between the two reels 12, 13. In the case of the illustrated embodiment, the camera 11 is of the rotary type provided with a slit mask. It is so adapted as to form the image of the data on the film held fast in position on the capstan which concurrently serves as one roller 15' in the aforementioned pair of feed rollers. Of course, the camera may be of any other desired type to suit the purpose of photography.

A plurality of short legs 16 are provided on the underside of the photographing section. One of the short legs 16 contains a downward recess adapted to cover the projecting portion 10 on the upperside of the developing section. The film outlet 17 which opens in the bottom surface of the recess communicates with the inlet 7 of the developing route in the upper surface of the projecting portion. Thus, the developing section "A" and the photographing section "B" are joined into an operable combination. Inside the photographing section, there is disposed a vertical guide route 18 which has a lower end terminating in the outlet 17 and the opposite end opposed to the storage reel 13. The leading end of the aforementioned horizontal guide route 14 joins the aforementioned vertical guide route 18 halfway along the length thereof. On emerging from the forward end of the horizontal guide route 14, the leading end of the exposed portion of the film is advanced past the joint of the two guide routes, then through the upper half part 18a of the vertical guide route 18, and finally toward the storage reel, there to be rewound. Thus, it is desirable to use as the storage reel a self-winding type autoreel capable of rotating itself in the forward direction, then catching hold of the leading end of the film, and rewinding the film thereon.

To ensure that the leading end of the film emerging from the forward end of the horizontal guide route 14 will advance through the upper half part 18a of the vertical guide route toward the storage reel, it suffices to adopt a measure for causing the leading end of the film to collide diagonally with the wall surface of the vertical path 18 and take its own course toward the storage reel so as to enable the leading end of the film to form an angle $\alpha$ with the vertical guide route 18 (FIG. 2) or by taking advantage of the tendency for the film to curl in the direction it was previously rolled or a measure such as forced advance means provided with a switch piece 19a or 19b which, while the photography is in progress, is held in an operable position for enabling the leading end of the film emerging from the forward end of the photographing route to collide diagonally therewith and take its own course toward the storage reel and, after the photography is terminated, turned to assume a retracted position (indicated by the chain line) where it does not interfere when the cut end of the exposed portion of the film is advanced through the lower half part 18b of the vertical guide route toward the outlet 17 by the reverse rotation of the storage reel as illustrated in FIG. 3(A) or 3(B). One or more such measures may be adopted to assure the optimum design of the photographing section for safe advance of the film therein. Particularly in the case of the switch piece 19b of FIG. 3(B), after the film has been cut as described more fully afterward, the storage reel is required first to be rotated in the forward direction to have the film rewound thereon enough for the cut tail end of the exposed portion of the film to rise above the upper end of the switch piece and, thereafter, the storage reel is to be rotated in the reverse direction. In this case, this switch piece 19b held in its retracted position serves as a funnel for ensuring the advance of the cut end of the film toward the interior of the lower half part 18b of the vertical guide route.

When one photographing operation is completed, the exposed portion of the film is separated from the remaining portion of the film by cutting the end of the exposed portion of the film, preferably at the end of a small trailing portion following the end of the exposed portion so that the trailing portion may be used for picking up the film with the finger tips without touching the exposed portion. To effect this cutting, a cutter 20 is disposed between the exposure position of the lens (the capstan 15') and the leading end of the guide route 14. This cutter 20 can be adapted so that while it is out of service, it is retained in its non-cutting position by virtue of its own weight or by means of a spring, and when it is required to cut the film, it is lowered onto the film by the motion of a solenoid 20' operable with a cut-command switch. Prior to this cutting, the feed roller 15 is driven in the forward direction and, at the same time, the storage reel is rotated in the forward direction for a length of time as by means of a timer so that the rear end of the exposed portion of the film may be brought to the cutting position of the cutter. When the cutting is completed, the storage reel is rotated in the forward direction until the cut end of the exposed portion of the film emerges from the forward end of the guide route 14. This action is indispensable when the cutter cuts the film midway along the length of the guide route, because the film is required to be advanced through the interior of the guide route 18 toward the outlet 17, with the cut end in the lead. This action is not always necessary when the cutter cuts the film at the front end of the guide route 14 (FIG. 2). Although this particular action can be obtained by a timer actuated with a terminal signal, it may be effected anytime before the storage reel is set rotating in its reverse direction where the apparatus is provided with a switch for starting the developing operation in addition to the cutter command switch.

In the illustrated embodiment, the apparatus is readied for photographing the data by opening the lid 29 of the housing of the photographing section, mounting the payoff reel 12 having a fresh roll of film wound thereon in position within the housing, drawing out the leading end of the film, passing it around the feed roller 15, through the horizontal guide route 14, past the upper half part 18a of the vertical guide route, directing the leading end of the film toward the storage reel 13, and closing the lid 29. Of course, the apparatus may be designed so that after the leading end of the film is nipped between the feed rollers 15, 15' and the lid is closed, the feed rollers 15, 15' will forward the film through the horizontal guide route 14 and the upper half part 18a of the vertical guide route 18 and permit the leading end of the film to be rewound on the storage reel.

After the lid has been closed, the power source switch is turned on to set the capstan, the main motor $M_1$ provided with reduction gearing for forward rotation of the storage reel, and the drive motor for the feed roller 8 of the developing section all moving and, at the same time, to start supply of electric current to the heater of the developing liquid tank via a thermostat.

In the present embodiment, the storage reel is rotated counterclockwise in the forward direction to take up the film by taking advantage of the curling force which the film has acquired while being wound on the payoff reel. The forward direction in which the storage reel is rotated to take up the film and the direction in which the capstan 15' is rotated to advance the film forward are opposite to each other. The main motor $M_1$, therefore, is adapted to cause the capstan to be rotated in the direction of forward feeding through the medium of the first claw type clutch $C_1$. At the same time, the driven shaft 21 of the first clutch drives the intermediate motor shaft 22a through the medium of a belt. The intermediate driven shaft 22b connected to or separated from this intermediate motor shaft 22a through the medium of the second claw type clutch $C_2$ drives the toothed wheel 23' of the storage reel driving shaft 23 in the direction of forward rotation, i.e. the direction opposite that of the capstan through gear transmission. It is desirable to dispose slippable sliding friction means 23a between the drive shaft 23 and the toothed wheel 23'. For the purpose of enabling the storage reel to be rotated in the forward direction for marginal feeding of the film and advancing the exposed portion of the film to the outlet, the toothed wheel 23' is meshed with the toothed wheel 24 which is rotated by the second reversible type motor $M_2$ for the reverse rotation of the storage reel through the medium of the third clutch $C_3$. Otherwise, the second motor $M_2$ may be designed for rotation in one fixed direction and it may be provided between the motor shaft and the toothed wheel 24 with an auxiliary shaft 25', for example, and further provided with mechanical means 25 adapted to change the direction of the rotation of the second motor through the medium of solenoid clutches $25C_1$, $25C_2$.

In the roll film wound on the payoff reel, a few outermost layers (about 1.5 meters in total length) has been exposed to light. After the payoff reel has been mounted in position within the housing of the photographing section and the lid closed, the storage reel is set rotating in the forward direction by turning on the blank feed switch and the third clutch $C_3$ and setting the second motor $M_2$ rotating until the roll film is given two complete rotations. Consequently, the leading end of the unexposed portion of the film is brought to the exposure position. The clutches $C_1$, $C_2$, $C_3$, $25C_1$, and $25C_2$ are all of solenoid operation type, so that they remain OFF when not supplied with power.

Besides being used for causing the exposed portion of the film to be taken up on the storage reel and bringing the leading end of the unexposed portion of the film to the exposure position at the outset of the photography, the blank feed switch may be used for inserting a blank of about one meter between the portion of the film exposed to one type of data and the portion of the film exposed to another type of data to facilitate detection of the change in the types of data as when the film is used for photographing a plurality of types of data. Since the distance of the film to be blank fed by this motor is limited to about one meter by the timer, the motor must be turned on two successive times for the exposed portion of the film to be rewound.

Now that the power source switch has been turned on to set the main motor $M_1$ rotating, the motor on detecting the data set in position for photography automatically turns on the first and second clutches $C_1$, $C_2$. Otherwise, the photographing switch is manually operated to turn on the first and second clutches. The feed roller 15 is rotated in the forward direction and the storage reel is also rotated in the forward direction to advance the film and effect successive exposure of the film to the data.

After one photographing operation is completed, the cut-command switch is turned on. Consequently, the tail end of the exposed portion of the film is brought to the cutting position as described above to be cut by the cutter. When necessary, a signal indicating the end of the cutting motion is issued to time the control and forward rotation of the storage reel through the medium of the second motor $M_2$ and the third clutch, with the result that the cut end of the exposed portion of the film passes beyond the forward end of the horizontal guide route 14. As the timer counts down the time set thereon, it establishes a power source connection to the detection means 9 of the developing section and alerts it for detection of the arrival of the film and, at the same time, sets the second motor $M_2$ rotating, turns on the third clutch $C_3$, starts the storage reel rotating in the reverse direction, and advances the exposed portion of the film along the guide route toward the outlet 17 with the cut end in the lead. As the leading end of the film departs from the outlet and immediately enters the inlet of the photographing route, the detection means 9 detects the arrival of the film and stops the rotation of the second motor and turns off the third clutch $C_3$. Then, the pair of pinch rollers 8 draws the exposed portion of the film out of the storage reel and advances it through the developing route.

In the arrangement described above, even the developing operation can be automatically started by turning on the cut-command switch mentioned above. Alternatively, the apparatus may be designed so that the development-command switch is provided separately of the cut-command switch. In this case, the cut-command switch may serve the purpose of bringing the tail end of the exposed portion of the film to the cutting position and then cutting the film at that end by means of a cutter, while the development-command switch will serve to start the reel rotating in the reverse direction and advancing the exposed portion of the film through the developing route.

When one photographing operation is completed partway along the length of the roll of film and the exposed portion of the film has undergone the developing operation, the storage reel is empty of roll of film and the photographing section is ready for starting the next photographing operation. In this case, if the cutting position at which the film is cut by the cutter falls directly behind the exposed position, there is a danger that the subsequently exposed portion at the new leading end of the roll of film may sustain damage when it is rewound on the storage reel. Besides, the leading end will have no blank portion available for handling by the finger tips. To avoid this inconvenience, it is desirable to adopt a feed means capable of advancing the film to a certain length in advance of each new photographing operation. This means is not required, however, where the cutting position of the film by the cutter is separated by a certain length from the exposed portion.

When, in this sense, the position at which the film is cut by the cutter is fixed at the forward end of the horizontal guide route, the action of advancing the film prior to the subsequent photographing operation and the action of rotating the storage reel in its forward direction for the purpose of causing the cut end of the exposed portion of the film to emerge from the forward end of the guide route can (with the exception of the case of FIG. 3(B)) be omitted. At the same time, the cut tail end of the exposed portion of the film comes into intimate contact with the wall surface of the vertical guide route 18 by virtue of its own elasticity (FIG. 2).

In the present embodiment, when the amount of data to be photographed is too great to be photographed on one roll of film, it becomes necessary to suspend the photographing operation, develop the exposed film, and then resume the photographing operation.

When the embodiment is modified so as to operate with a cassette having a payoff reel, a storage reel, and a cutter built in as a set, the photographing operation can be continued after a brief interruption during which the cassette used is removed from the housing of the photographing section and a new cassette is loaded in position in the housing. This advantage is enjoyed in addition to the various merits mentioned previously.

Structurally this modification is substantially equivalent to causing an 8-mm motion-picture camera originally designed for operation with a roll of film wound on a reel and loaded within the housing thereof to be modified so that the housing thereof can accommodate a cassette having built therein a payoff reel containing a roll of film and a takeup reel for rewinding the film after exposure and, once the cassette is loaded in position within the housing, the reels inside the cassette can be operated from outside the housing. The fact that the cutter contained in the cassette can be operated from outside the housing to effect the required cutting of the film and the fact that the outlet for discharging the exposed portion of the film by the reverse rotation of the storage reel is also disposed in the cassette are the only differences.

FIG. 5 represents one typical example of such a cassette "S". The cassette is provided inside with a payoff reel 12 and a storage reel 13. The leading end of the film wound on the payoff reel is fastened beforehand to the axis of the storage reel so as to be rewound thereon by the rotation of the storage reel. The cassette also contains a cutter 20 used for cutting the film between the exposure position and the forward end of the photographing route. The cutter, while not in use, is kept in its retracted position as with a spring. The shaft 15a of the capstan 15', the shaft 13a of the storage reel 13, and the shaft 20a of the cutter 20 which serve as means for advancing the film in the forward direction have their opposite ends exposed from the cassette shell, though sealed to avoid leakage of light. At least the film outlet 17 is kept closed with a shutter 26.

When the cassette is loaded in position within the photographing housing or when the lid is closed on the loaded cassette, the shutter 26 is pushed diagonally against the force of the spring 27 which tends to draw the shutter toward its closed position by a protuberance provided on the housing or on the lid. The shutter 26 may be adapted so that in consequence of this diagonal motion, the slit 26' of the shutter itself which communicates with the outlet opens the outlet. Of course, the shutter 26 may be similarly provided for the exposure slit which is formed in the cassette opposite the position for film exposure (FIG. 5).

Figure 7:
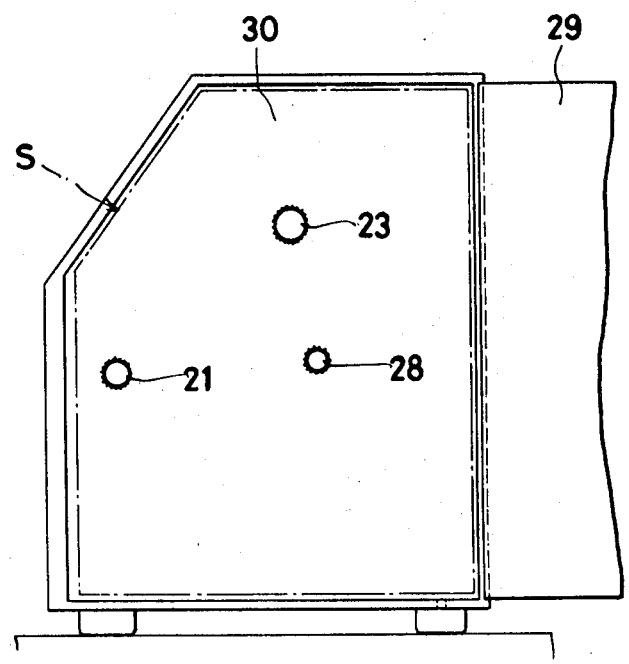
FIG. 7 is a side view illustrating the interior of a housing of the photographing section wherein the cassette is to be loaded.
Figure 11:
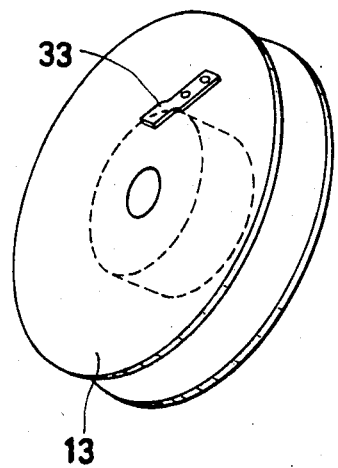
FIG. 11 is a perspective view of a storage reel.
Figure 8:
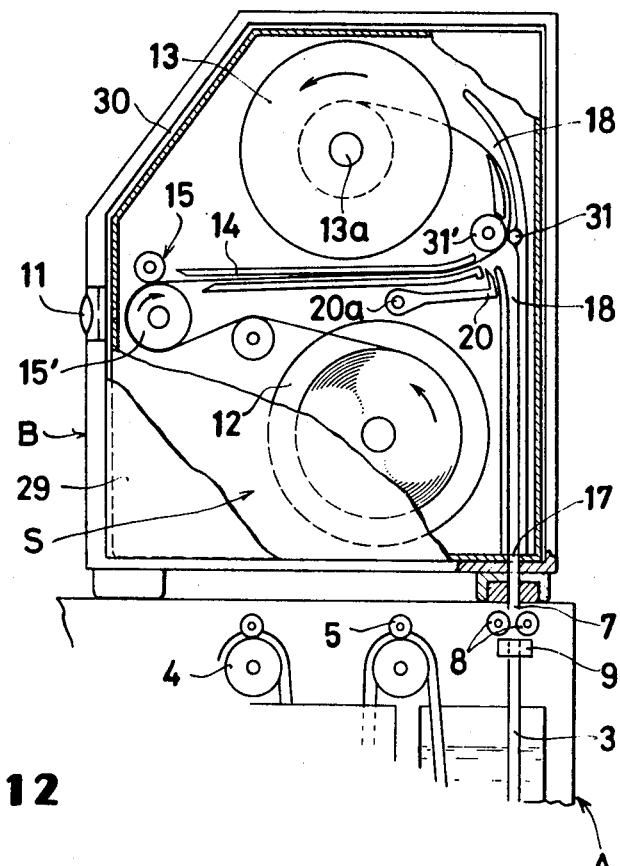
FIG. 8 is a longitudinally sectioned side view illustrating a second embodiment of the combination photographing and developing apparatus according to the present invention, with a cassette loaded in position within the photographing section thereof.
Figure 12:
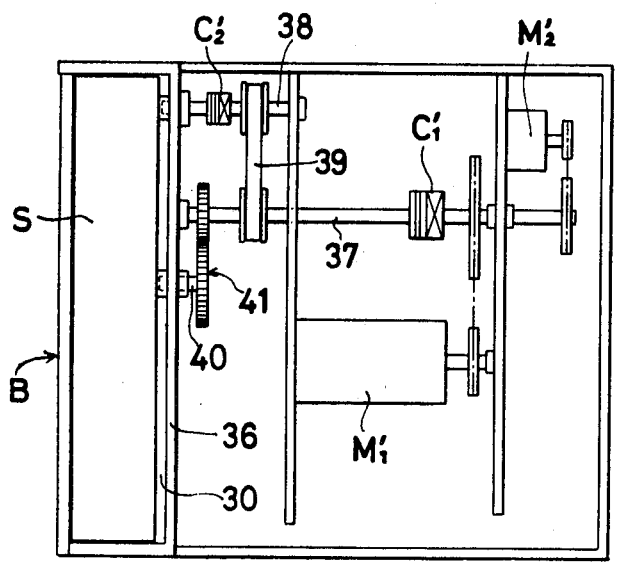
FIG. 12 is a plan view illustrating the driving unit for the apparatus of FIG. 8.

Besides the camera, the driven shaft 21 of the first clutch $C_1$ for driving the capstan within the cassette, the driving shaft 23 for driving the storage reel in the forward and rearward directions, and the shaft 28 adapted to be angularly rotated as by a solenoid to impart a cutting motion to the cutter protrude inside the photographing housing 30. Their respective protruding ends are adapted to come into slip-free engagement with the capstan shaft 15a, the storage reel shaft 13a, and the cutter shaft 20a respectively (FIG. 7).

When the cassette is loaded in position within the housing, therefore, the apparatus is operated as described above to effect the required photography. When photographing operation is completed, the user cuts the roll film at the tail end of the exposed portion thereof, transfers the exposed portion of the film, with the cut end in the lead, to the developing section via the outlet 17' of the cassette and the outlet 17 of the photographing housing, and subjects the roll of film to development. If the exposure slit of the cassette is opened, the user is required to turn on the blank feed switch to move the leading end of the unexposed portion of the roll of film to the exposure position before the subsequent series of photographing motions is started.

In case where part of the data to be photographed still remains after one whole roll of film in the cassette has been used up or where data of a type different from the data being photographed are required to be photographed, the lid of the housing can be opened to permit replacement of the cassette now in use with a new cassette or some other cassette used for the new data. Thus, the photographic operation can be continued after a short interruption. After the new data have been photographed on the new cassette, the exposed portions of the roll of films in the old and new cassettes can be developed by having their respective cassettes reloaded in the housing one by one. The development is started by turning on the cut-command switch as described previously. Where the development-command switch is also provided separately of the cut-command switch, however, the cut-command switch is turned on either before the cassette is removed from within the photographing housing or after the removed cassette is reloaded in the housing for the development of the exposed portion of the roll of film. The development-command switch has only to be turned on after the loading of the cassette for the sole purpose of starting the developing operation.

When the cassette system described above is adopted where the photographing section and the developing section are joined into one operable combination by establishing communication between the outlet of the photographing route and the inlet of the developing route or where the two sections are disposed in one same machine frame, the exposed portion of the roll of film contained in the cassette removed from the housing cannot be developed until the cassette now in use in the housing is removed from the housing.

In this case, however, the development of the roll of film in the cassette used up can be carried out simultaneously with the photography by having the photographing section and the developing section formed separately of each other. Thus, the advantage of the adoption of the cassette system can be enjoyed to the fullest extent. In this case, the photographing section is no longer required to be provided with the outlet for transferring the exposed portion of the roll of film to the developing section. Instead, the developing section is required to be provided with a housing for accommodating the cassette, adapted to establish communication between the inlet of the developing route and the outlet provided in the housing, fitted with a driving device for rotating the storage reel and in the reverse direction. The device for operating the cutter and the device for rotating the storage reel in the forward direction to move the cutting position of the cutter to a point behind the exposure position of the film may be incorporated when necessary.

In the case of the cassette "S", an electric device such as a solenoid adapted to actuate the cutter can be incorporated in the cassette in such a manner that, when the cassette is loaded in position within the housing of the photographing section or the developing section and, consequently, the power supply terminal of the apparatus proper and the electric contact of the cassette come into operable contact with each other, this cutter operating device within the cassette can be actuated by turning on the cut-command switch or the development-command switch provided on the apparatus.

In the embodiment so far described, after one photographing operation is completed, the film is cut at the tail end of the exposed portion of the roll of film and the storage reel is rotated in the reverse direction to transfer the exposed portion of the roll of film, with the tail end in the lead, to the developing section to be developed.

The time required for the tail end of the exposed portion of the roll of film to reach the developing section varies between when the exposed portion of the film is long and the diameter of the roll of film rewound on the storage reel is large and when the exposed portion is short and the diameter of the roll of film is small because of the difference in the peripheral speed due to the change in the diameter of the roll of the exposed portion of the film. Although the occurrence of this difference is not a critical fault, it is nevertheless desirable to use a means capable of enabling the tail end of the exposed portion of the film to reach the developing section at a constant speed without reference to the amount of film exposed in a single photographing operation. An embodiment including such a means will be described with reference to FIGS. 8–12.

The construction of the developing section "A" is identical with that of the embodiment of FIG. 1. Thus, the description of this construction is omitted.

The photographing section "B" has a housing 30 closed on one lateral side with an openable lid 29 and adapted to accommodate therein the cassette "S". The cassette "S" in this embodiment contains in the lower part thereof a payoff reel 12 having a roll of film wound thereon, in the upper part thereof a reversible auto-reel type storage reel 13 adapted to rewind the exposed portion of the roll of film when rotated in the forward direction, and in the middle part thereof one pair of feed rolls 15 and a cutter 20. The roll of film which is released from the payoff reel 12 is passed round the capstan 15' which forms one of the pair of feed rolls 15, then advanced along the horizontal guide route 18 stretched between the two reels 12, 13 and defined by the lateral guides, subsequently forwarded upwardly into the upper half part 18a of the vertical guide route 18 intersecting the horizontal guide route, and finally rewound on the storage reel 13. The cutter is actuated by a proper command to cut the film at the outlet end of the aforementioned horizontal guide route 14.

The upper half part 18a of the vertical guide route 18, while the photography is in progress, serves as a path through which the exposed portion of the roll of film is advanced to and rewound on the storage reel 13. While the exposed portion of the roll of film is being developed, the upper half part 18a serves as a path through which the exposed portion of the roll of film is forwarded to the inlet of the developing route via the lower half part 18b of the vertical guide route and the outlet 17. In the present embodiment, the upper half part 18a of the vertical guide route 18 is provided with a pair of pinch rolls 31, 31' adapted to catch hold of the exposed portion of the roll of film and forward it backward at least during the development. In the illustrated embodiment, the aforementioned pair of pinch rolls 31, 31' are disposed on the upper half part 18a side of the intersection between the horizontal guide route 14 and the vertical guide route 18. When the film being exposed departs from the horizontal guide route, advances through the upper half part of the vertical guide route, and proceeds to the storage reel 13, the leading end of this film first wedges its way between the pinch rolls 31, 31'. The pair of pinch rolls may be so adapted that the opposed rolls are slightly separated from each other while the film is being exposed but are kept in tight contact while the exposed portion of the film is moved rearward for the purpose of development. Otherwise, they may be kept in tight contact at all times as in the present embodiment. Further, in the present embodiment, of the pair of rolls disposed at the corner of the horizontal guide route and the upper half part 18a of the vertical guide route, the main roll 31' of a larger diameter is rotated in the same direction as the storage reel during the photography as will be described more fully later.

After passing through the horizontal guide route 14 and colliding with the vertical guide route 18, the leading end of the film still tending to form an upward curl which as a result of having been wound on the payoff reel is smoothly pushed into and nipped by the pair of pinch rolls 31, 31'. Thus, it is positively advanced upwardly through the upper half part 18a of the vertical guide route toward the storage reel owing to the rotation of the main roll 31'. The speed at which the main roll 31' advances the film toward the storage reel is equalized to the speed at which the capstan 15' advances the film in the forward direction for the purpose of photography. In the present embodiment, therefore, the pair of pinch rolls concurrently serve the purpose of pushing the leading end of the film safely toward the storage reel during the photography.

The storage reel 13 is required to rotate itself to take up the film while the film is being exposed and on the other hand, to rotate itself rearward to release the exposed portion of the roll film so far taken up when the pair of pinch rolls advances the film backward toward the inlet 7 of the developing route for the purpose of development and when the group of driving rollers in the developing route advance the film after the start of the development. When the storage reel is rotated in the forward direction during the photography, the peripheral speed of this reel gradually increases in proportion as the diameter of the roll of film rewound on the reel grows. If the peripheral speed is allowed to increase, then the tension exerted upon the film between the storage reel and the pinch rollers or the capstan grows possibly even to the extent of breaking the film. To preclude this trouble, the storage reel is desired to be adapted so that the reel slips after the tension of the film has reached a prescribed magnitude.

The storage reel in this embodiment, therefore, is rotatably fitted around the shaft 13a thereof provided in the cassette and exposed on one end thereof, and it is then interlocked with the shaft 13a through the medium of the slip rotation means 32 and the ratchet means 33. Although the storage reel is not necessarily required to be interlocked with the reel shaft 13a, the main roll 31' of the pair of pinch rolls 31 is interlocked with the shaft 13a in the present embodiment as described above.

To be specific, the main roll 31' and the reel shaft 13a are rotated in the same direction because the toothed wheel 34 is fastened to the reel shaft 13a and is meshed with the toothed wheel 31a which is fastened to the shaft of the main roll 31' through the medium of the intermediate toothed wheel 34'. With the surface of the toothed wheel 34, the ratchet disc 33a rotatably mounted on the shaft 13a is kept in slipping contact through the medium of a friction lining such as leather. The storage reel 13 is engaged with the ratchet disc 33a through the medium of the ratchet pawl 33b. Any ordinary ratchet device will do here. In the present embodiment, the teeth on the ratchet disc 33a are formed by the protuberances 33' circularly spaced on the surface of the disc opposed to the storage reel. The ratchet pawl 33b of the storage reel is a leaf spring diagonally disposed, with one end thereof fastened to the surface of the storage reel opposed to the ratchet disc and the other free end opposed to the aforementioned protuberances 33'. Because of this arrangement, when the reel shaft 13a is rotated in the forward direction during the exposure of the film to the data, it causes the ratchet disc 33a to be rotated frictionally and enables one of the circularly spaced protuberances 33' to be pressed against the ratchet pawl 33b so as to impart rotation to the storage reel 13 in the forward direction, with the result that the exposed portion of the film will be rewound on the storage reel. At the same time, the shaft 13a causes the main roll 31' of the pinch rolls to be synchronously rotated in the same direction through the medium of the intermediate toothed wheel 34' and consequently advances positively the film toward the storage reel. As excessive tension is exerted on the film, the ratchet disc 33a slips on the surface of the toothed wheel 34 which is simultaneously rotating with the shaft 13a to prevent the film from otherwise possible breakage. When the main roll 31' of the pinch rolls is rotated in the rearward direction to advance the exposed portion of the roll of film backwardly, the ratchet disc 33a rotates itself in the rearward direction by causing the protuberances to keep the tip of the ratchet pawl 33b in the upwardly retracted position. Consequently, the storage reel rotates itself in the rearward direction while the tip of the ratchet pawl chases after the protuberances 33' owing to the force with which the pair of pinch rolls pull the exposed portion of the roll of film in the backward direction, with the result that the exposed portion of the film formerly rewound on the storage reel will be paid off.

The cassette is provided along the vertical guide route 18 with an inner bottom plate 35. The guide route is formed on this inner bottom plate and the pair of pinch rolls are also planted on the inner bottom plate. The shaft of the main roll 31' is pierced downwardly through the inner plate, with the lower end thereof supported on the bottom plate of the cassette. The toothed wheel 31a is fastened to the portion of the shaft of the main roll which protrudes from the lower side of the inner bottom plate.

The photographing section "B" is provided behind the housing 30 thereof with a machine chamber. When the cassette is contained in the housing, the driving shaft which is interlocked with the shaft 13a of the storage reel, the shaft 15a of the capstan, and the shaft 20a of the cutter pierces the boundary wall 36 between the two chambers and thrusts into the housing.

Within the machine chamber are installed a forward-motion motor $M_1'$ for driving the capstan and advancing the film in the forward direction and a rearward-motion motor $M_2'$ for rotating the main roll 31' of the pinch rolls, advancing the film in the rearward direction, and advancing the exposed portion of the roll of film, with the tail end thereof in the lead, toward the inlet of the developing route. There are also mounted a first driving shaft 37 serving to transmit the rotations of the two motors $M_1'$ and $M_2'$ and a second driving shaft 38 having one end thereof thrust out of the boundary wall 36 and interlocked with the shaft 15a of the capstan. These two shafts are interlocked with a suitable conveying device 39 such as an endless chain belt so as to be rotated in the same direction. In the present embodiment, since the storage reel 13 and the capstan 15' serving to advance the film in the forward direction for the purpose of photography are rotated in opposite directions, the boundary wall 36 contains a hole for supporting in position therein an auxiliary shaft 40 having one end thereof thrust into the photographing section and interlocked with the reel shaft 13a of the storage reel. The other end of the auxiliary shaft is interlocked with the first driving shaft 37 through the medium of the toothed wheel 41. Consequently, the auxiliary shaft is rotated in the direction opposite the direction in which the first driving shaft and the second driving shaft for rotating the capstan are rotated. Where the storage reel and the capstan serving to advance the film in the forward direction are to be rotated in the same direction, it suffices to have one end of the first driving shaft pierced through the boundary wall and thrust into the photographing section. In this case, there is no need for the auxiliary shaft 40 and the toothed wheel 41.

The first driving shaft 37 is interlocked, at the end closer to the boundary wall, with the second driving shaft 38 and the auxiliary shaft 40 through the medium of the transmission device 39 and the toothed wheel 41 respectively. The rotations of the two motors $M_1'$ and $M_2'$, therefore, are conveyed to the other end of the first driving shaft. The first clutch $C_1'$ is disposed in the middle part of the first driving shaft 37 and the second clutch $C_2'$ is disposed on the second driving shaft 38. The two clutches are of electromagnetic type and, therefore, are engaged by the supply of power.

Further, the boundary wall 36 contains another hole for holding in position therethrough a cutter operating shaft (not shown) having one end thereof thrust into the photographing section and interlocked with the shaft 15a of the cutter. Inside the machine chamber, there is provided an electromagnet adapted to attract magnetically the arm formed on the other end of the cutter operating shaft and consequently impart a cutting motion to the cutter.

The cassette is put in the housing. To start the photographing operation the power source switch is turned on to supply power flow to the forward-motion and rearward-motion motors, the first and second clutches, and the motor for operating the driving rolls in the developing section and, at the same time, supply power to the heater for the liquid tank 1 through the thermostat. Then, the photographic switch is turned on to supply power flow to the forward-motion motor. When necessary, the blank feed switch is turned on to establish electrical contact between the first and second clutches and effect required blank feeding of the leading end portion of the roll of film. In the condition described above, the storage reel and the capstan do not rotate in the forward direction because the first and second clutches remain out of engagement in spite of the rotation of the forward-motion motor. As the individual pieces of the data subjected to photography are brought one by one to the photographing position, the switch provided at the photographing position detects them one at a time and supplies the power flow to the first and second clutches and engages the two clutches. Consequently, the storage reel, the capstan, and the main roll of the pinch rolls are rotated in their forward directions to forward the film and continue the photography. The exposed portion of the roll of film is sequentially rewound on the storage reel. In this case, when either of the forward-motion motor $M_1'$ and the rearward-motion motor $M_2'$ is rotated by supply of power flow, the other motor produces sympathetic rotation.

When one photographing operation is completed, the developing switch is turned on. Consequently, power is fed to the forward-motion motor and the first and second clutches for a period controlled by the timer, with the result that the roll of film is advanced in the forward direction until the rear end of the exposed portion of the film which happened to lie on the capstan is brought to the position in front of the outlet of the horizontal guide route 14, namely, the cutting position. Then, the cutter is actuated to cut the film. Now, the timer again operates to supply power to the forward-motion motor and the first clutch, causing the film to advance slightly until the cut tail end of the exposed portion of the film reaches a point where it is nipped between the pair of pinch rolls. (At this time, since no power is fed to the second clutch, the capstan is not rotated and the leading end of the film released from the payoff reel remains at the cutting position.) Subsequently, the power is supplied to the rearward-motion motor and the first clutch. Consequently, the main roll of the pinch rolls is rotated rearwardly and the pair of the pinch rolls advances the exposed portion of the film backwardly with the tail end in the lead, to the lower half part 18b of the vertical guide route. At the same time, the storage reel 13 is set to the condition capable of backward rotation, with the result that the portion of the film still remaining on the storage reel will be drawn out by the attraction generated by the preceding portion of the film already being advanced rearwardly by the pair of pinch rolls. Thus, the tail end of the exposed portion of the film departs from the outlet 17 and enters the inlet 7 of the developing route. When the detection device 7' detects the arrival of the tail end at the inlet 7, it starts the motor for the driving rolls rotating and starts the driving rolls and the feed rolls at the inlet of the developing route rotating. At this time, the feed rolls nip the tail end of the exposed portion of the film and advance the film through the developing route to effect the development of the film. At the time that the terminal of the film departs from the outlet 3' of the developing route, the motor for operating the driving rolls is stopped and the feed rolls are separated from each other and, at the same time, the developing switch is reset, the rearward-motion motor is restarted, and the first clutch is shut off. The speed at which the pinch rolls advance the exposed portion of the film in the rearward direction, therefore, is equalized with the speed at which the feed rolls 8 and the driving rolls 5 of the developing section advance the film along the developing route.

When the development of the exposed portion of the film is completed, the photographing switch is turned on to start the next cycle of photography and development in the sequence described above. When the exposed portion of the film is advanced rearwardly for the purpose of development after the photography, the tail end of the exposed portion of the film reaches the developing section after a fixed length of time without reference to the amount of the photography involved or the length of the film used in the preceding photographing operation.

The present invention has been described with reference to one embodiment of the apparatus using a cassette containing a roll of film. Optionally, this invention can be worked by loading the photographing section with a payoff reel having a roll of film wound thereon instead of using the cassette. In this case, the function of the photographic section due to the use of the cassette can be obtained by providing the photographing section in the inside thereof with a capstan, a storage reel, a pair of pinch rolls, and a cutter. The ratchet device for rotating the storage reel in the forward direction during the photography and rendering the storage reel reversibly rotatable during the development and the slip rotation device required during the forward rotation of the storage reel can be installed within the housing. Otherwise, it may be disposed en route to the auxiliary shaft 40 or the first driving shaft 37 and installed within the machine chamber so that the storage reel will be rotated jointly with the auxiliary shaft or the first driving shaft.

Even in the case of the cassette type apparatus, the ratchet device 33 and the slip rotation device 32 need not be provided for each cassette but may be disposed en route to the auxiliary shaft 40 or the first driving shaft 37 and installed within the machine chamber, so that the storage reel will be rotated jointly with the auxiliary shaft or the first driving shaft. Instead of using two motors, one for the forward motion and the other for the rearward motion, the apparatus of this invention may use just one motor adapted so as to transmit the rotation thereof to the storage reel, the capstan, and the main roll of the pair of pinch rolls via their respective clutches, cause the main roll to rotate selectively in the forward or rearward direction through the medium of a proper rotary direction changing device provided with an auxiliary axis, for example, and enable the storage reel to become freely rotatable by the retraction of the clutch and effect the release of the exposed portion of the roll of film during the development. Otherwise, the storage reel, the capstan, and the pinch rolls may be severally provided with motors, so that they can be driven by these motors independently of one another.

Figure 13:
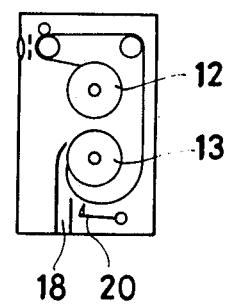
FIG. 13 is a schematic diagram illustrating a third embodiment of the combination photographing and developing apparatus according to the present invention.
Figure 9:
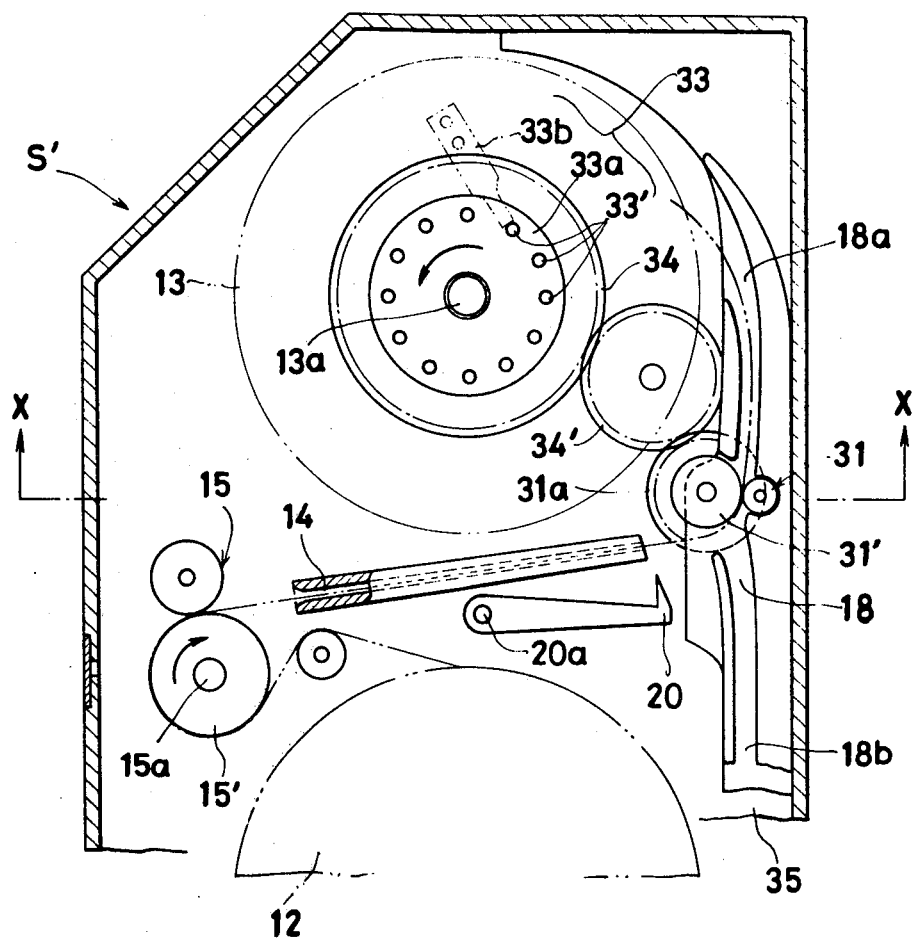
FIG. 9 is an enlarged cross section of the important part in the interior of the cassette of FIG. 8.
Figure 10:
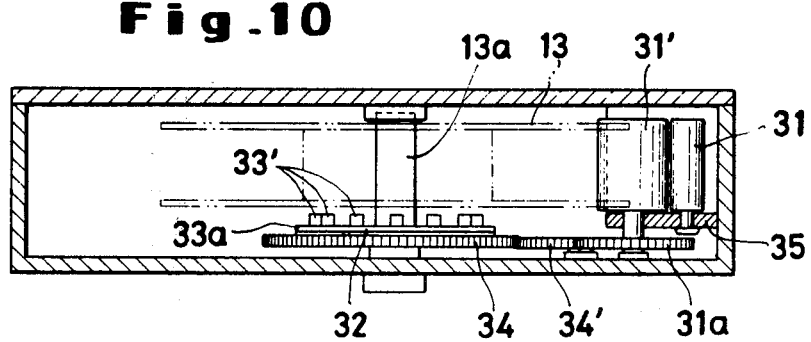
FIG. 10 is a cross section taken along the line X—X in FIG. 9.

This invention has been described with reference to a few preferred embodiments. The invention is not limited to these embodiments. The embodiments can be modified in various aspects without departing from the technical idea of the invention set forth in the claims. Particularly as regards the positional relationship between the payoff reel 12 and the storage reel 13, they may be reversed so that the storage reel is positioned below the payoff reel as illustrated in FIG. 13.

What is claimed is:

1. In a combination photographing and developing apparatus operated by mounting in the photographing section thereof a roll of film wound on a payoff reel, advancing the film from the payoff reel along a guide route by a film feed means, effecting photography by exposing the film to given data, cutting the film with a cutter behind the end of the exposed portion thereof, forwarding the exposed portion of the film, with the cut end in the lead, through the outlet of the photographing section to the inlet of the developing section, and leading the film along a developing route passing through developing, fixing, and washing liquid tanks and a drying means in the developing section thereby effecting the development and drying of the film, the improvement wherein the photographing section thereof comprises in combination a storage reel disposed before said guide route and adapted to be selectively advanced in the forward or rearward direction, means for rotating said storage reel in the forward direction synchronously with the photographing operation, said forward rotation of the storage reel enabling the exposed portion of the film to be rewound on the storage reel, a vertical guide route formed between said storage reel and the outlet for the exposed portion of the film, said guide route having the leading end thereof join said vertical guide route halfway along the length thereof, a cutter disposed between the position for film exposure and the leading end of said guide route and adapted to cut the film behind the exposed portion thereof, and means for advancing the exposed portion of the film, with the cut tail end thereof in the lead, through said vertical guide route toward the outlet.

2. The combined photographing and developing apparatus according to claim 1, wherein the outlet for the exposed portion of the film of the photographing section is connected to the inlet of the developing route in the developing section, with the joining point sealed optically.

3. The combined photographing and developing apparatus according to claim 1 or claim 2, wherein the photographing section comprises a housing incorporating therein a camera, driving means for operating a film feeding means, forward-motion driving means for advancing a storage reel at least in the forward direction, and means for operating the cutter and adapted to be closed tightly with a lid and a cassette possessed of film feeding means, a payoff reel, a storage reel, and a cutter as built-in components and further provided with an inlet for photographing light, a guide route, a vertical guide route, and an outlet, said cassette being so adapted that when it is mounted in position within said housing, said film feed means is interlocked with the driving means thereof, the storage reel with the forward-motion driving means, and the cutter with the cutter operating means respectively and, at the same time, said outlet is closed at all times with a shutter capable of opening and closing the outlet.

4. The combined photographing and developing apparatus according to claim 3, wherein the housing is provided with a second outlet adapted to communicate with the outlet and further with the inlet of the developing route in the developing section when the cassette is mounted in position within the housing, the housing is further provided between the housing body and the cassette means adapted so that, when the cassette is mounted in position within the housing, said means opens the shutter serving to keep the outlet of the cassette closed, and the forward-motion driving means for the housing incorporates means for switching the direction of the rotation of said driving means.

5. The combined photographing and developing apparatus according to claim 3, wherein the inlet of the cassette for admitting photographing light is normally kept closed with a freely openable shutter which is adapted to be opened when the cassette is mounted in position within the housing.

6. The combined photographing and developing apparatus according to claim 1, which further comprises means for advancing the film along the guide route toward the storage reel prior to causing the cutter to cut the film, so that the film will be cut behind the end of the exposed portion thereof.

7. The combined photographing and developing apparatus according to claim 1, which further comprises means for rotating the storage reel in the forward direction after the exposed portion of the film has been cut with the cutter, thereby bringing the cut tail end of the exposed portion of the film to a position in the vertical guide route.

8. The combined photographing and developing apparatus according to claim 1, which further comprises a pair of pinch rolls disposed in the vertical guide route between the storage reel and the forward end of the guide route and adapted to nip the exposed portion of the film and advance the film toward the film outlet rearwardly while the film is being developed.

9. The combined photographing and developing apparatus according to claim 8, which further comprises a ratchet means capable of rotating the storage reel in the forward direction thereby causing the exposed portion of the film to be rewound on the storage reel during the photographing operation and allowing the storage reel to rotate in the rearward direction owing to the rearward advance of the exposed portion of the film during the developing operation.

* * * * *